US012008252B2

(12) United States Patent
Burton et al.

(10) Patent No.: US 12,008,252 B2
(45) Date of Patent: Jun. 11, 2024

(54) DATA STORAGE DEVICE WITH DATA PADDING AND SAFE AND EFFICIENT ALIGNMENT OF DATA ZONES WITH DATA CONTAINERS

(71) Applicant: WESTERN DIGITAL TECHNOLOGIES, INC., San Jose, CA (US)

(72) Inventors: Scott Burton, Westminster, CO (US); Daniel J. Wade, Boulder, CO (US); Eric B. Smith, Denver, CO (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/850,945

(22) Filed: Jun. 27, 2022

(65) Prior Publication Data

US 2023/0418493 A1 Dec. 28, 2023

(51) Int. Cl.
G11B 20/18 (2006.01)
G06F 3/06 (2006.01)
G11B 20/12 (2006.01)

(52) U.S. Cl.
CPC .......... *G06F 3/064* (2013.01); *G06F 3/0607* (2013.01); *G06F 3/0619* (2013.01); *G06F 3/0674* (2013.01)

(58) Field of Classification Search
CPC .......... G06F 12/0886; G06F 12/0804; G06F 12/0871; G06F 2212/032; G11B 5/00;

(Continued)

(56) References Cited

U.S. PATENT DOCUMENTS 5,241,531 A 8/1993 Ohno et al.
5,583,842 A 12/1996 Wilson et al.
(Continued)

FOREIGN PATENT DOCUMENTS

EP 0429435 A2 5/1991
KR 100464440 B1 6/2004

OTHER PUBLICATIONS

BlockDevices—https://www.cs.yale.edu/homes/aspnes/pinewiki/BlockDevices.html; Jun. 17, 2014; 4 pages.
(Continued)

*Primary Examiner* — Nabil Z Hindi
(74) *Attorney, Agent, or Firm* — Calderon Safran & Wright, PC

(57) ABSTRACT

Various illustrative aspects are directed to a data storage device, comprising one or more disks; an actuator mechanism configured to position heads proximate to a recording medium of the disks; and one or more processing devices. The processing devices are configured to detect a criterion for inserting padding on the recording medium proximate to data containers to be written to the recording medium, the containers configured for assigning logic blocks to the containers, the logic blocks configured to store data to be written in an interleaved pattern across sectors based on a distributed sector encoding scheme, wherein detecting the criterion comprises detecting a mismatch in size between at least a portion of a zone and an integer number of containers in which to write the at least a portion of the zone; and insert mapping indicators to a mapping to indicate padding blocks proximate to the containers.

19 Claims, 6 Drawing Sheets

(58) Field of Classification Search
CPC ....... G11B 5/54; G11B 20/1419; G11B 20/12; G11B 27/36; G11B 5/09; G11B 20/18; G11B 20/1866
USPC .................................................... 360/48, 53
See application file for complete search history.

(56) References Cited

U.S. PATENT DOCUMENTS

| | | | |
|---|---|---|---|
| 5,818,654 | A | 10/1998 | Reddy et al. |
| 5,844,911 | A | 12/1998 | Schadegg et al. |
| 5,848,438 | A | 12/1998 | Nemazie et al. |
| 5,937,435 | A | 8/1999 | Dobbek et al. |
| 6,101,619 | A | 8/2000 | Shin |
| 6,295,176 | B1 | 9/2001 | Reddy et al. |
| 6,341,109 | B1 | 1/2002 | Kayanuma |
| 6,654,904 | B1 | 11/2003 | Andoh et al. |
| 7,245,445 | B2 | 7/2007 | Lee |
| 8,959,281 | B1 | 2/2015 | Malina et al. |
| 9,032,154 | B2 * | 5/2015 | Liu ............... G06F 12/0886 711/125 |
| 9,059,737 | B2 | 6/2015 | Coker et al. |
| 9,063,838 | B1 | 6/2015 | Boyle et al. |
| 9,368,152 | B1 | 6/2016 | Park |
| 9,632,863 | B2 | 4/2017 | Galbraith et al. |
| 10,261,707 | B1 | 4/2019 | Chaichanavong et al. |
| 10,910,012 | B1 | 2/2021 | Kobayashi et al. |
| 10,998,001 | B1 | 5/2021 | Varnica et al. |
| 11,061,582 | B2 | 7/2021 | Oberg |
| 2001/0042223 | A1 | 11/2001 | Hoskins |
| 2003/0223328 | A1 | 12/2003 | Nadershashi et al. |
| 2004/0100715 | A1 | 5/2004 | Smith et al. |
| 2007/0074087 | A1 | 3/2007 | Lo |
| 2008/0244356 | A1 | 10/2008 | Bliss et al. |
| 2013/0038961 | A1 | 2/2013 | Song |
| 2014/0379965 | A1 | 12/2014 | Gole et al. |
| 2016/0012850 | A1 | 1/2016 | Feldman |
| 2020/0272339 | A1 | 8/2020 | Oberg |
| 2022/0076695 | A1 | 3/2022 | Shibasaki |

OTHER PUBLICATIONS

[PATCHv5 00/14] dm-zoned: metadata version 2 https://www.spinics.net/lists/dm-devel/msg40779.html; May 11, 2020; 5 pages.

Xie et al. "ZoneTier: A Zone-based Storage Tiering and Caching Co-Design to Integrate SSDs with Host-Aware SMR Drives"; https://sc17.supercomputing.org/SC17%20Archive/tech_poster/poster_files/post204s2-file3.pdf; Jul. 10, 2019; 1 page.

Lenny Sharp, "Making Host Managed SMR Work for You—Dropbox's Successful Journey"; https://blog.westerndigital.com/host-managed-smr-dropbox/; Jun. 12, 2018; 10 pages.

Shingled Magnetic Recording + HelioSeal® Technology; https://media.bitpipe.com/io_15x/io_152122/item_2244017/white-paper-shingled-magnetic-recording-helioseal-technology-.pdf; Jun. 2018; 5 pages.

Alexander Thomasian, "Survey and Analysis of Disk Scheduling Methods", ACM SIGARCH Computer Architecture News, vol. 39, No. 2, May 2011, pp. 8-25. https://sci-hub.se/https://doi.org/10.1145/2024716.2024719.

Notice of Allowance dated Jan. 9, 2024 in related U.S. Appl. No. 17/841,460, 12 pages.

* cited by examiner

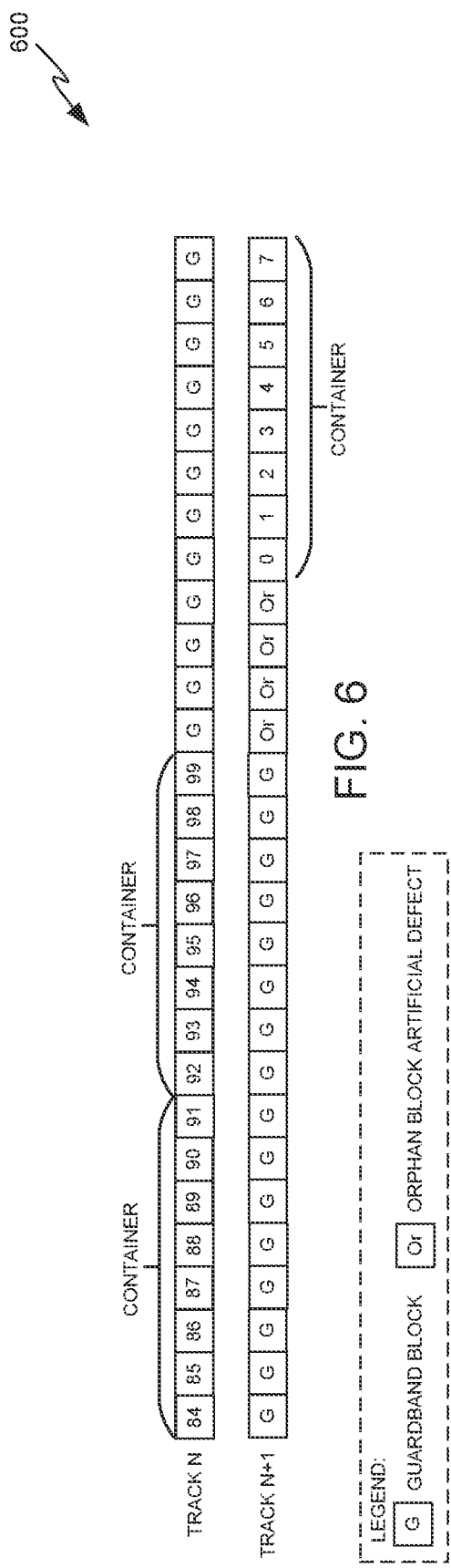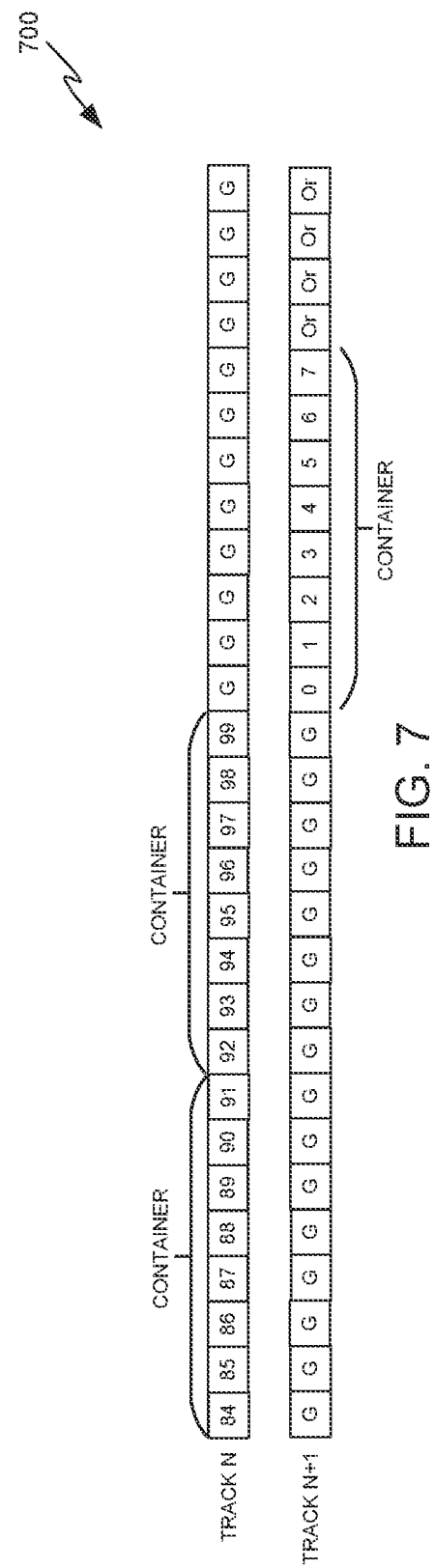

DATA STORAGE DEVICE WITH DATA PADDING AND SAFE AND EFFICIENT ALIGNMENT OF DATA ZONES WITH DATA CONTAINERS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo wedges or servo sectors. The servo sectors comprise head positioning information (e.g., a track address) which is read by the head and processed by a servo control system to control the actuator arm as it seeks from track to track.

FIG. 1 shows a prior art disk format 2 as comprising a number of radially-spaced, concentric servo tracks 4 defined by servo wedges $6_0$-$6_N$ recorded around the circumference of each servo track. A plurality of concentric data tracks are defined relative to the servo tracks 4, wherein the data tracks may have the same or a different radial density (e.g., tracks per inch (TPI)) than the servo tracks 4. Each servo wedge $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo wedge (e.g., servo wedge $6_4$) further comprises groups of phase-based servo bursts 14 (e.g., N and Q servo bursts), which are recorded with a predetermined phase relative to one another and relative to the servo track centerlines.

The coarse head position information is processed to position a head over a target data track during a seek operation, and the servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to one or more head actuators in order to actuate the head radially over the disk in a direction that reduces the PES. The one or more head actuators may comprise a voice coil motor, as well as one or more fine actuators, in some examples.

Disk drive control circuitry may use various means to encode data to be written onto disk surfaces. Disk drive control circuitry may, for example, encode data together with error correction code (ECC) bits in code in the form of codewords, such as low-density parity-check (LDPC) codewords. Disk drive control circuitry may interleave encoded data, to be written in an interleaved pattern onto disk surfaces. Disk drive control circuitry may encode blocks of data spanning multiple sectors into codewords in a distributed sector encoding scheme, and perform and implement further advantageous techniques, such as are disclosed in U.S. Pat. No. 9,059,737 issued to Coker et al. and assigned to the same assignee as the present disclosure, and which is incorporated in its entirety by reference herein.

SUMMARY

Various examples disclosed herein provide data storage devices such as hard disk drives with control circuitry that may detect one or more criteria for inserting padding on a recording medium proximate to data containers to be written to the recording medium, and inserting mapping indicators, such as artificial defects, to a mapping of the recording medium to indicate one or more padding blocks proximate to the one or more data containers on the recording medium. For example, in contexts such as when data storage devices interface with a host, such as a data center control system, the host may manage data zones on the data storage devices (known as host-managed zones or HMZs). The host may define its own management specifications for zones, such as by defining certain sizes of zones. Control circuitry of a data storage device in various examples of this disclosure may also manage its own data in terms of data containers of a defined size, such as a certain number of data blocks of a defined size, and may insert padding such as artificial defects into containers to bring the containers efficiently into alignment with the host-managed zones, and/or insert padding before or after containers to designate leftover blocks in a track as orphans. In further examples of this disclosure, such as when certain writing techniques such as Shingle Magnetic Recording (SMR) are used, control circuitry of a data storage system may watch for and detect criteria of enhanced need for readability and/or enhanced infringement on readability, and may designate radially adjacent padding for SMR zones to protect and/or enhance readability, in accordance with novel and advantageous insights of this disclosure.

Various illustrative aspects are directed to a data storage device, comprising one or more disks; an actuator mechanism configured to position one or more heads proximate to a recording medium of the one or more disks; and one or more processing devices. The one or more processing devices are configured to: detect a criterion for inserting padding on the recording medium proximate to one or more data containers to be written to the recording medium, the data containers configured for assigning a plurality of logic blocks to the data containers, the logic blocks configured to store data to be written in an interleaved pattern across a plurality of sectors based on a distributed sector encoding scheme, wherein detecting the criterion comprises detecting a mismatch in size between at least a portion of a zone and an integer number of one or more of the data containers in which to write the at least a portion of the zone; and insert, in response to detecting the criterion, one or more mapping indicators to a mapping of the recording medium to indicate one or more padding blocks proximate to the one or more data containers on the recording medium.

Various illustrative aspects are directed to a method comprising detecting, by one or more processing devices, a criterion for inserting padding on a recording medium proximate to one or more data containers to be written to the recording medium, the data containers configured for assigning a plurality of logic blocks to the data containers, the logic blocks configured to store data to be written in an interleaved pattern across a plurality of sectors based on a distributed sector encoding scheme, wherein detecting the criterion comprises detecting a mismatch in size between at least a portion of a zone and an integer number of one or more of the data containers in which to write the at least a portion of the zone. The method further comprises inserting, by the one or more processing devices, in response to detecting the criterion, one or more mapping indicators to a mapping of the recording medium to indicate one or more padding blocks proximate to the one or more data containers on the recording medium.

Various illustrative aspects are directed to one or more processing devices comprising means for detecting a criterion for inserting padding on a recording medium proximate to one or more data containers to be written to the recording medium, the data containers configured for assigning a plurality of logic blocks to the data containers, the logic blocks configured to store data to be written in an interleaved pattern across a plurality of sectors based on a distributed sector encoding scheme, wherein the means for detecting the criterion comprises means for detecting a mismatch in size between at least a portion of a zone and an integer number of one or more of the data containers in which to write the at least a portion of the zone. The one or more processing devices further comprise means for inserting, in response to detecting the criterion, one or more mapping indicators to a mapping of the recording medium to indicate one or more padding blocks proximate to the one or more data containers on the recording medium.

Various further aspects are depicted in the accompanying figures and described below, and will be further apparent based thereon.

BRIEF DESCRIPTION OF THE DRAWINGS

Various features and advantages of the technology of the present disclosure will be apparent from the following description of particular examples of those technologies, and as illustrated in the accompanying drawings. The drawings are not necessarily to scale; the emphasis instead is placed on illustrating the principles of the technological concepts. In the drawings, like reference characters may refer to the same parts throughout the different views. The drawings depict only illustrative examples of the present disclosure, and are not limiting in scope.

FIGS. 6-8 each illustrate examples of the end of a first zone written to containers on a final track for that first zone, and the beginning of a second zone written to containers on a first track for that second zone, in accordance with aspects of the present disclosure.

DETAILED DESCRIPTION

Figure 1:
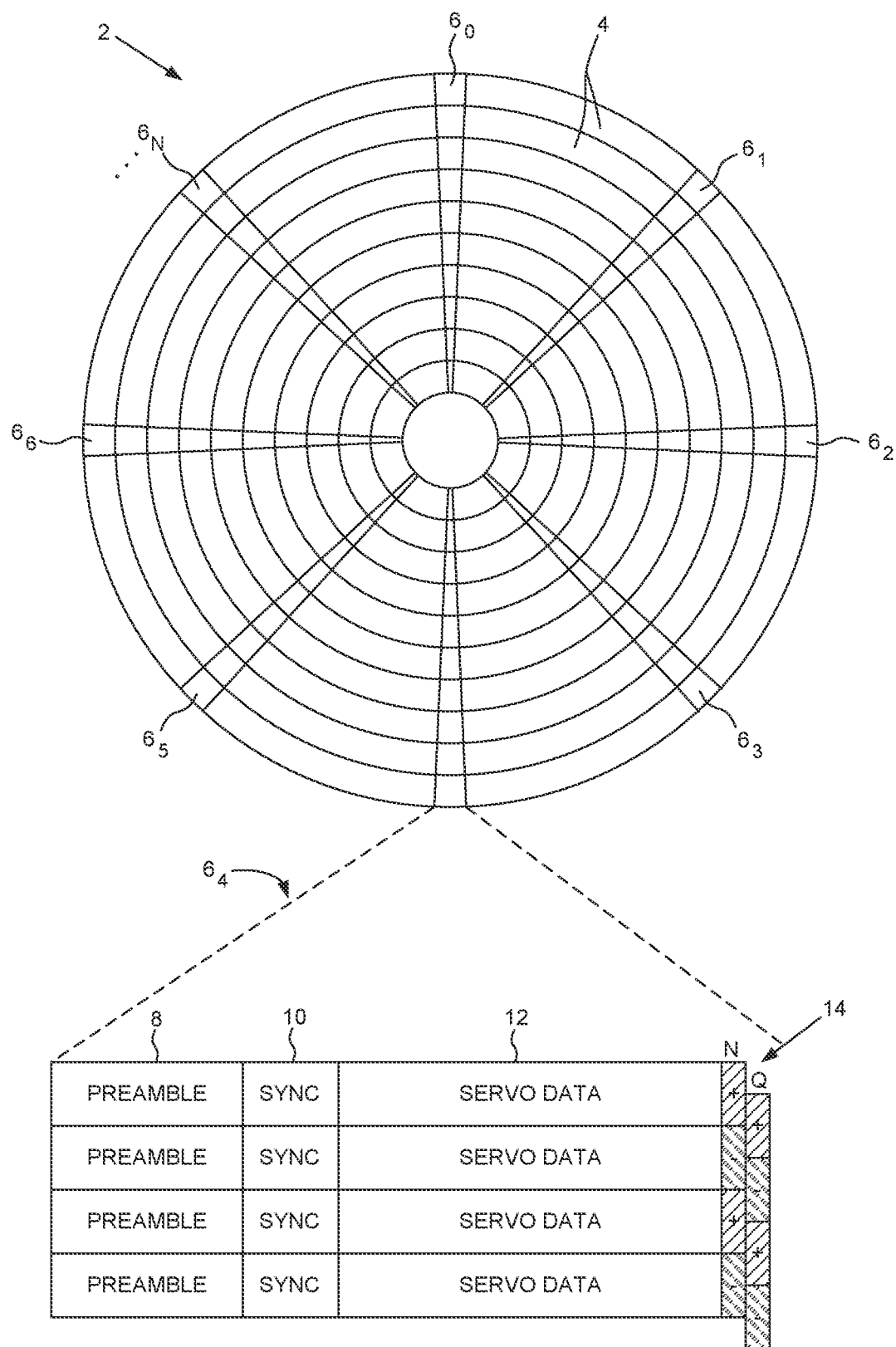
FIG. 1 shows a prior art disk format as comprising a number of radially-spaced, concentric servo tracks defined by servo wedges recorded around the circumference of each servo track.
Figure 2:
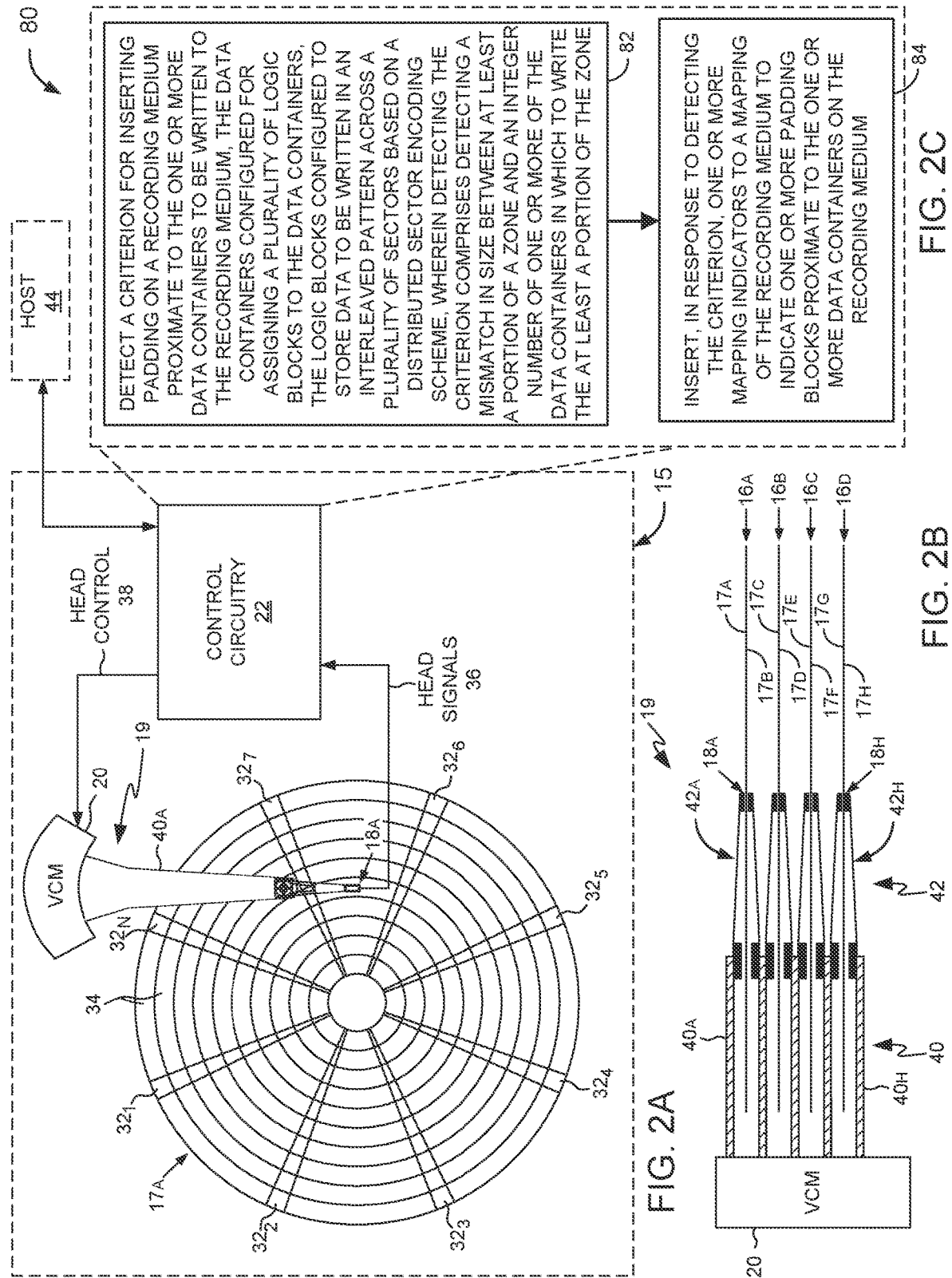
FIGS. 2A and 2B illustrate conceptual block diagrams of a top view and a side view of a data storage device in the form of a disk drive, in accordance with aspects of the present disclosure.
FIG. 2C depicts a flowchart for an example method that control circuitry of a disk drive may perform or execute in controlling the operations of the disk drive, including for detecting a criterion for inserting padding proximate to data containers and inserting mapping indicators for such padding to a mapping of a recording medium, in accordance with aspects of the present disclosure.

FIGS. 2A and 2B illustrate conceptual block diagrams of a top view and a side view of a data storage device in the form of a disk drive 15, in accordance with aspects of the present disclosure. Disk drive 15 comprises control circuitry 22, an actuator arm assembly 19, and a plurality of hard disks 16A, 16B, 16C, 16D ("hard disks 16"). FIG. 2C depicts a flowchart for an example method 80 that control circuitry 22 of disk drive 15 may perform or execute in controlling the operations of disk drive 15, in accordance with aspects of the present disclosure, including operations involved in detecting a criterion for detect a criterion for inserting padding on a recording medium proximate to one or more data containers to be written to the recording medium, and inserting one or more mapping indicators to a mapping of the recording medium to indicate one or more padding blocks proximate to the data containers on the recording medium. Control circuitry 22 may perform such operations for aligning the ends of data block containers with the ends of host-managed zones, including by inserting artificial defects into data tracks, and other operations to add padding within and around containers and zones, as further described below, in accordance with aspects of the present disclosure.

Actuator arm assembly 19 comprises a primary actuator 20 (e.g., a voice coil motor ("VCM")) and a number of actuator arms 40 (e.g., topmost actuator arm 40A, as seen in the perspective view of FIGS. 2A and 2B). Each of actuator arms 40 comprises a suspension assembly 42 at a distal end thereof (e.g., example topmost suspension assembly 42A comprised in topmost actuator arm 40A, in the view of FIGS. 2A and 2B). Each suspension assembly 42 may comprise one or more additional fine actuators, in some examples.

Each of actuator arms 40 is configured to suspend one of read/write heads 18 ("heads 18") in close proximity over a corresponding disk surface 17 (e.g., head 18A suspended by topmost actuator arm 40A over topmost corresponding disk surface 17A, head 18H suspended by lowest actuator arm 40H over lowest corresponding disk surface 17H). Other examples may include any of a wide variety of other numbers of hard disks and disk surfaces, and other numbers of actuator arm assemblies, primary actuators, and fine actuators besides the one actuator arm assembly 19 and the one primary actuator 20 in the example of FIGS. 2A and 2B, for example.

In various examples, disk drive 15 may be considered to perform or execute functions, tasks, processes, methods, and/or techniques, including aspects of example method 80, in terms of its control circuitry 22 performing or executing such functions, tasks, processes, methods, and/or techniques. Control circuitry 22 may comprise and/or take the form of one or more driver devices and/or one or more other processing devices of any type, and may implement or perform functions, tasks, processes, methods, or techniques by executing computer-readable instructions of software code or firmware code, on hardware structure configured for executing such software code or firmware code, in various examples. Control circuitry 22 may also implement or perform functions, tasks, processes, methods, or techniques by its hardware circuitry implementing or performing such functions, tasks, processes, methods, or techniques by the hardware structure in itself, without any operation of software, in various examples.

Control circuitry 22 may comprise one or more processing devices that constitute device drivers, specially configured for driving and operating certain devices, and one or more modules. Such device drivers may comprise one or more head drivers, configured for driving and operating heads 18. Device drivers may be configured as one or more integrated components of one or more larger-scale circuits, such as one or more power large-scale integrated circuit (PLSI) chips or circuits, and/or as part of control circuitry 22, in various examples. Device drivers may also be configured as one or more components in other large-scale integrated circuits such as system on chip (SoC) circuits, or as more or less stand-alone circuits, which may be operably coupled to other components of control circuitry 22, in various examples.

Primary actuator 20 may perform primary, macroscopic actuation of a plurality of actuator arms 40, each of which may suspend one of heads 18 over and proximate to corresponding disk surfaces 17 of disks 16. The positions of heads 18, e.g., heads 18A and 18H, are indicated in FIG. 2A, although heads 18 are generally positioned very close to the disk surfaces, and are too small to be visible if depicted to scale in FIGS. 2A and 2B.

Example disk drive 15 of FIGS. 2A and 2B comprises four hard disks 16. Other examples may comprise any number of disks, such as just one disk, two disks, three disks, or five or more disks. Hard disks 16 may also be known as platters, and their disk surfaces may also be referred to as media, or media surfaces. The four hard disks 16 comprise eight disk surfaces 17A, 17B, 17C, 17D, 17E, 17F, 17G, and 17H ("disk surfaces 17"), with one disk surface 17 on each side of each hard disk 16, in this illustrative example. Actuator assembly 19 suspends heads 18 of each actuator arm 40 over and proximate to a corresponding disk surface 17, enabling each of heads 18 to write control features and data to, and read control features and data from, its respective, proximate disk surface 17. In this sense, each head 18 of each actuator arm 40 interacts with a corresponding disk surface 17.

The term "disk surface" may be understood to have the ordinary meaning it has to persons skilled in the applicable engineering fields of art. The term "disk surface" may be understood to comprise both the very outer surface layer of a disk as well as a volume of disk matter beneath the outer surface layer, which may be considered in terms of atomic depth, or (in a greatly simplified model) the number of atoms deep from the surface layer of atoms in which the matter is susceptible of physically interacting with the heads. The term "disk surface" may comprise the portion of matter of the disk that is susceptible of interacting with a read/write head in disk drive operations, such as control write operations, control read operations, data write operations, and data read operations, for example.

In the embodiment of FIGS. 2A and 2B, each disk surface, e.g., disk surface 17A as shown in FIG. 2A, comprises a plurality of control features. The control features comprise servo wedges $32_1$-$32_N$, which define a plurality of servo tracks 34, wherein data tracks are defined relative to the servo tracks 34, and which may be at the same or different radial density. Control circuitry 22 processes a read signal 36 emanating from the respective head, e.g., head 18A, to read from disk surface 17A, to demodulate the servo wedges $32_1$-$32_N$ and generate a position error signal (PES) representing an error between the actual position of the head and a target position relative to a target track. A servo control system in the control circuitry 22 filters the PES from the servo wedges using a suitable compensation filter to generate a control signal 38 applied to actuator arm assembly 19, including to control actuator 20, which functions as a primary actuator, and which rotates actuator arm assembly 19 about an axial pivot in order to perform primary actuation of the corresponding heads radially over the disk surfaces 17 in a direction that reduces the PES, as well as to control any fine actuators, in various examples. Control circuitry 22 may also apply control signals to and receive sensor signals from heads 18 and/or any of various components of disk drive 15, in various examples.

In the example of FIGS. 2A and 2B, actuator arm assembly 19 rotates actuator arms 40 about a common pivot. In another example, a first actuator arm assembly and/or VCM and a second actuator arm assembly and/or VCM, or other types of primary actuators, may each be configured to actuate respective actuator arm assemblies or sets of multi-actuator arms about separate pivots, for example, mounted at different circumferential locations about the disks. Other examples may employ more than two actuator arm assemblies or primary actuators or multi-actuators, which may be actuated about a common pivot, or which may be comprised in multiple multi-actuators mounted at different circumferential locations about the disks. Actuator arm assembly 19 and/or any of these other examples may thus constitute and/or comprise an actuator mechanism, in various examples.

In executing example method 80 of FIG. 2C (aspects of which will also be further explained below with reference to the further figures), control circuitry 22 may issue one or more commands to other components of disk drive 15, receive information from one or more other components of disk drive 15, and/or perform one or more internal operations, such as generating one or more driver currents for outputting to system components of disk drive 15. In particular, control circuitry 22 may detect a criterion for inserting padding on a recording medium of disks 18, such as disk surfaces 17, proximate to one or more data containers to be written to the recording medium, the data containers configured for assigning a plurality of logic blocks to the data containers, the logic blocks configured to store data to be written in an interleaved pattern across a plurality of sectors based on a distributed sector encoding scheme, wherein detecting the criterion comprises detecting a mismatch in size between at least a portion of a zone and an integer number of one or more of the data containers in which to write the at least a portion of the zone (82). Control circuitry 22 may further insert one or more mapping indicators to a mapping of the recording medium to indicate one or more padding blocks proximate to the one or more data containers on the recording medium, as indicated in the mapping of the recording medium (84). Control circuitry 22 may further perform additional actions, methods, and techniques, in accordance with various aspects including as further described herein.

Control circuitry 22 may organize and/or encode data (e.g., in the form of low-density parity-check (LDPC) codewords, or into any other applicable encoding) into logic blocks of a selected size (measured in terms of amounts of data), for example, 4 kilobytes (kB) of data per logic block, or any other amount of data per logic block in other examples. Control circuitry 22 may map and interleave the logic blocks in an interleaving pattern of one or more logic blocks per each distributed sector across the media blocks. In one example, control circuitry 22 may assign, map, and interleave eight logic blocks of 4 kB of data each in an interleaved pattern per each distributed sector across the media blocks, thereby generating distributed sectors of 32 kB of data each. In some examples, control circuitry 22 may implement up to a maximum of 16 interleaves per each media sector, and may implement a distributed sector of size larger than 16, such that the first media sector has interleaves from only the first 16 logical blocks. In other examples, control circuitry 22 may assign, map, and interleave any other numbers of logic blocks of any size into each distributed sector, and with interleaves from any other number of source logical blocks.

Control circuitry 22 may map each distributed sector to correspondingly sized, physical dispersed, distributed areas of one or more disk surface media blocks on one or more disk surfaces 17 of disk drive 15. The media blocks may be spread across write gates of disk surfaces 17, which may be or include the writeable areas of disk surfaces 17 that aren't occupied by control patterns such as servo patterns. Mapping the logic blocks of data into relatively large distributed sectors spread across disk surfaces 17 may provide certain advantages, such as averaging variations in track misregistration (TMR) and signal-to-noise ratio (SNR), diluting the impact of defects in the disk surface across logic blocks, and achieving more closely spaced operable data tracks to achieve higher data density of data tracks per width, such as may be measured in tracks per inch (TPI), even with the same number of logic blocks and relative to data density as measured in blocks per inch (BPI). Such distributed sectors may have a one-to-one correspondence with data containers, in various examples, or may have one-to-many or many-to-one or other forms of correspondence with data containers, in various examples. Track layouts may be defined in a container constitution. Interleaving may not necessarily change how disk drive 15 writes data, but it may change the payloads of write operations. To read each interleaved logic block may require reading across all the corresponding media blocks across which the logic block is written. Under the encoding scheme, interleaving logic blocks may logically spread the effects of sections of a media defect on disk surface 17, such as a scratch or any other mechanical or chemical infringement or other off-nominal effect on disk surface 17 that prevents or inhibits nominal writes to and reads from that infringed section of disk surface 17, across logic blocks. Spreading the defect across logic blocks may enable writing tracks closer together, thereby increasing tracks per inch (TPI), even with the same number of logic blocks and relative to data density as measured in blocks per inch (BPI).

Distributed sectors, or data containers, may be limited in size by the size of a memory buffer of control circuitry 22, in various examples. Control circuitry 22 may load the entirety of data to encode in one distributed sector into the memory buffer before writing that distributed sector to one or more disk surfaces 17. Control circuitry 22 may encode, based on a distributed sector encoding scheme, data into a plurality of logic blocks of data. The logic blocks of data comprise the data to be written being interleaved across a plurality of sectors, and subject to assignment to data containers. The control circuitry may then write the data in the logic blocks to the recording medium of one or more disk surfaces 17. Control circuitry may write data to one media block on a disk surface 17 at a time, and each media block on a disk surface 17 may comprise interleaved data from some or all of the logic blocks comprised in the applicable distributed sector. Disk drive 15 of this disclosure may comprise a substantially large memory buffer, relative for example to traditional memory buffer sizes in the industry as understood by persons skilled in the applicable field of art, in some examples, which may help enable use of and encoding data into substantially large distributed sectors.

Control circuitry 22 may also encode data into data containers, or simply containers, where each container may or may not be one-to-one identical in size (e.g., block size, or size in terms of number of logic blocks) or may or may not have a one-to-one mapping with a distributed sector, in various examples of this disclosure. The size of the container may be defined as the number of sectors and/or the number of logic blocks used by the container to store its data. Control circuitry 22 may specify a container constitution, which may define all of the criteria and policies for a track layout and how to assign data logic blocks into containers, in various examples of this disclosure. Distributed sectors may store a large block of data interleaved across multiple media sectors. Distributed sectors may be implemented having any of various sizes, in various implementations.

Control circuitry 22 may assign and map a set of logic blocks to a corresponding set of media sectors, in a one-to-one correspondence between number of logic blocks and number of media sectors to which that collection of logic blocks is written, in an interleaved manner, in various examples. The media sectors may correspond to sectors of a track or of one or more tracks written to the media surface or disk surface 17. Control circuitry 22 may thus assign logic blocks, in a number of logic blocks that may have a one-to-one correspondence to a number of corresponding media sectors, to be written to a given track or set of tracks, in various examples.

Control circuitry 22 may define container constitutions, assign data to logic blocks and distributed sectors, and assign the layout and placement of data. Control circuitry 22 may address management of host-managed zones ("HMZs" or "zones"), managed by host 44, which may be a control system for a data center, a storage area network, a server, or any other form of host. A zone may thus comprise a host-managed data zone to be managed by host 44, external to a data storage device such as disk drive 15. In various examples, control circuitry 22 may address and manage zones in the context of Shingle Magnetic Recording (SMR). Throughout this disclosure, reference may be made interchangeably to a "host-managed zone" or a "zone," which may refer to an SMR HMZ, or another type of zone, in various embodiments. Various examples disclosed herein provide data storage devices such as hard disk drives 15 with control circuitry 22 that may align the ends of zones with the ends of containers and distributed sectors, as further described below, in accordance with aspects of the present disclosure.

A portion of the runtime code for handling host-managed zones may comprise standard procedures that the runtime code follows when it reaches the end of a zone. A portion of the runtime code for handling containers may also comprise standard procedures for processing the entirety of each container it processes. If a zone ends in the middle of a container, the remaining blocks in the final container past the end of the zone may be referred to as runts, and the presence of a runt may typically throw an exception in existing, conventional runtime code. Properly addressing runts with runtime code may thus require novel modifications to the runtime code. On the other hand, by inserting padding such as artificial defects in accordance with aspects of this disclosure, control circuitry 22 may always be able to push the end of a zone into alignment with the end of a container, thus leveraging existing formatting code for mapping around defects outside of runtime, and avoiding the need for any novel changes to the runtime code stack to address the end of a host-managed zone in the middle of a container, in various examples. For a zone that crosses tracks, control circuitry 22 may insert an artificial defect to a track prior to a final track for that zone, so that the final block of the zone is located in the final block of the final distributed sector and the final container for that zone, in various examples.

Thus, in various examples, a data storage device such as disk drive 15 may comprise one or more disks 16; an actuator mechanism such as actuator arm assembly 19 configured to position one or more heads 18 proximate to disk surfaces 17 of the one or more disks 16; and one or more processing devices, such as the one or more processing devices of control circuitry 22. One or more processing devices of control circuitry 22 may be configured to detect a criterion for inserting padding, such as artificial defects, orphan blocks, and/or guardband blocks (as further explained below), on a recording medium, such as one or more of disk surfaces 17, proximate to one or more data containers to be written to the recording medium. Control circuitry 22 may also designate any padding type, such as orphan blocks and/or guardband blocks, by various means including by designating them as artificial defects, in various examples in accordance with this disclosure, and as further described below. One or more processing devices of control circuitry 22 may also be configured to insert one or more mapping indicators to a mapping of the recording medium to indicate one or more padding blocks proximate to the one or more data containers on the recording medium, in various examples in accordance with this disclosure, and as further described below.

Figure 3:
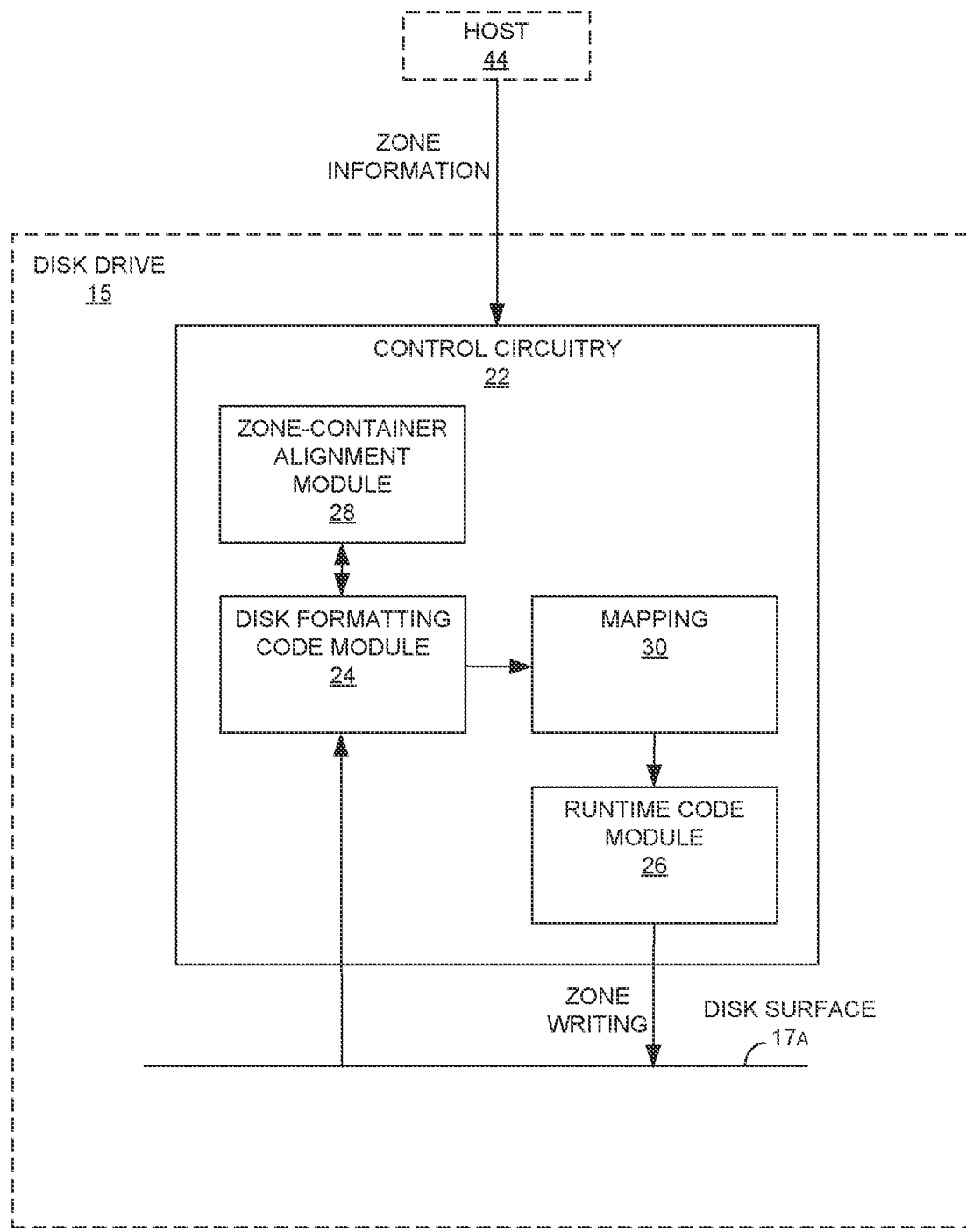
FIG. 3 illustrates a conceptual block diagram of disk drive 15 with further details of control circuitry 22, in accordance with aspects of the present disclosure.

FIG. 3 illustrates a conceptual block diagram of disk drive 15 with further details of control circuitry 22, in accordance with illustrative aspects of this disclosure. Control circuitry 22 may comprise a disk formatting code module 24, a runtime code module 26, and a zone-container alignment module 28. Disk formatting code module 24 and runtime code module 26 may comprise any hardware and/or software involved in implementing, executing, and/or embodying disk formatting code and runtime code, respectively, in accordance with aspects of the present disclosure. Disk formatting code module 24, runtime code module 26, and zone-container alignment module 28 may comprise any hardware and/or software and are not limited by any other definitions of the term "module" in any other software or computing context.

Disk formatting code module 24 may handle scanning, mapping, and/or and formatting disk surfaces 17 prior to, or intermittent with, ordinary write and read operations of disk drive 15. As part of this, disk formatting code module 24 may scan for and map defects in disk surfaces 17 and generate mapping 30 of physical sectors or areas of the recording medium of disk surfaces 17 to use for ordinary write and read operations, which may skip over defects in disk surfaces 17. Mapping 30 may constitute or be implemented as a mapping, a map, or a list, in any form, that provides indications of the status of positions on disk surfaces 17, and where to write and not to write on disk surfaces 17. Disk formatting code module 24 may also update mapping 30 over time, including to add designated defects or artificial defects to mapping 30, as directed by zone-container alignment module 28. Disk formatting code module 24 may also update mapping 30 to remove designated or artificial defects again from mapping 30, again as directed by zone-container alignment module 28, in some examples. Control circuitry 22 may be configured to write data to the recording medium of disk surfaces 17 pursuant to mapping 30.

Runtime code module 26 may handle ordinary write and read operations of disk drive 15. In executing write and read operations, runtime code module 26 may simply refer to results generated by disk formatting code module 24, such as mapping 30 of physical sectors or areas of disk surfaces 17, including disk surface 17A, to use for ordinary write and read operations. Runtime code module 26 may thus simply operate with reference to mapping 30 of physical sectors or areas of disk surfaces 17 to use for ordinary write and read operations as generated by disk formatting code module 24 and zone-container alignment module 28. Runtime code module 26 may thus operate without any capability of its own to detect or account for defects, and may not have any independent need for detection of or accounting for defects, since that would be redundant with mapping 30 that it is provided by disk formatting code module 24 and zone-container alignment module 28.

In various examples, zone-container alignment module 28 of control circuitry 22 may receive an incoming zone information, which may comprise instructions and data for a new zone, from host 44, to write to a new host-managed zone. Zone-container alignment module 28 may receive an incoming zone information comprising instructions and data for a new zone to write, identify or select one or more containers on disk surface 17A to write the new zone to, identify a number of blocks of mismatch in size between the new zone to be written based on the new zone information and the selected one or more containers, select one or more functional, non-defective blocks in the one or more containers prior to the last block of the one or more containers, designate those selected blocks as defects (thus, as "designated defects" or "artificial defects"), and then confirm instructions for runtime code module 26 to write a new zone based on the new zone information to the selected one or more containers, comprising the new artificial defects.

In various examples, zone-container alignment module 28 may communicate these designations of defects to disk formatting code module 24, prior to the writing of the zone by runtime code module 26, or prior to the writing of the one or more tracks to contain the designated artificial defects. Disk formatting code module 24 may then update mapping 30 of the applicable disk surfaces 17 (e.g., generate a newly updated mapping 30 in place of an initially or previously generated mapping 30) to add the newly designated defects to its mapping 30 of the applicable disk surfaces 17. Disk formatting code module 24 may insert artificial defects to mapping 30 at positions on one or more tracks in a zone. Control circuitry 22 may then start a zone write operation and write the zone as it would have, up to the start of one or more tracks containing artificial defects as indicated in mapping 30, and write in accordance with the artificial defects. Control circuitry 22 may begin write operations in tracks prior to any artificial defects in any order before, coinciding with, or after indicating one or more artificial defects in mapping 30 for one or more tracks subsequent to one or more tracks in which write operations have begun for the zone. In various examples, zone-container alignment module 28 may write such new mappings to mapping 30 directly, without going through disk formatting code module 24. Such "designated defects" or "artificial defects" are thus not true defects or actual defects, but merely designated as defects in mapping 30, reversibly and temporarily (or with the capability of being temporary, unless control circuitry 22 elects to keep such mappings 30 more or less permanent or long-term in some applications), in the updated mapping 30 of applicable disk surfaces 17.

Runtime code module 26 may then write a zone, as specified by the received zone information, to the applicable one or more containers on disk surfaces 17, making reference to the mapping 30 of the disk surfaces 17 as surfaced to it by disk formatting code module 24, to conduct its write operations as it normally would. With the newly designated defects, runtime code module 26 writes the zone to the one or more containers in such a way that the final block of the zone is aligned with and written to the final block of the final container of the one or more containers (or with the end of the single container, if the zone is written to only one container), in various examples.

In this way, control circuitry 22 may cause the ends of zones to be aligned with the ends of containers, in a way that poses substantial novel advantages over potential alternative or more naïve techniques for implementing zones on containers, including any that were to involve making novel modifications to runtime code, such as implementing runtime code to deal with runt blocks in a container past the end of a zone (which would throw an exception in conventional, existing runtime code), or implementing novel runtime code to skip blocks in containers while writing zones (which does not exist in conventional, existing runtime code). In contrast, creating and using designated defects in the disk formatting and/or mapping 30 to align the ends of zones with the ends of containers, as in implementations of the present disclosure, may provide novel advantages such as being substantially more streamlined, efficient, and lower-risk than alternatives such as those involving novel changes to runtime code, for example.

Various implementations of this disclosure may thus accomplish novel, advantageous effective changes in the effective behavior of the runtime code, to align the ends of zones with the ends of containers, without necessarily needing to make any change to the runtime code itself, as it has been previously implemented and validated. Rather, control circuitry 22 as illustrated in FIG. 3 may modify the effective behavior of runtime code module 26 by only changing its inputs, by way of mapping 30, as generated by zone-container alignment module 28 and/or disk formatting code module 24, in various examples.

Such designated defects or artificial defects may thus exist only as designations by the formatting code, and so are impermanent and reversible at will, and without impacting reliability. If and when the formatting code of control circuitry 22 overwrites zones and writes new zones to the same disk surface, control circuitry 22 may freely overwrite the designations of artificial defects at will in a newly updated mapping 30, and freely make use of blocks for data that it had previously designated as defects. Control circuitry 22 may remove and reuse designated or artificial defects without impacting reliability (in contrast to the removal of a real defect, which can impact reliability).

In addition to the specific illustrative examples described above, other examples of the present disclosure may be implemented in other forms and configurations. Zone-container alignment module 28 may comprise or be comprised in disk formatting code module 24 in other examples. Various examples are not limited to implementing any of the particular components, techniques, or advantages described above. In various examples, control circuitry 22 may comprise and use any of a variety of components, elements, and techniques for aligning the ends of zones with the ends of containers.

Figure 4:
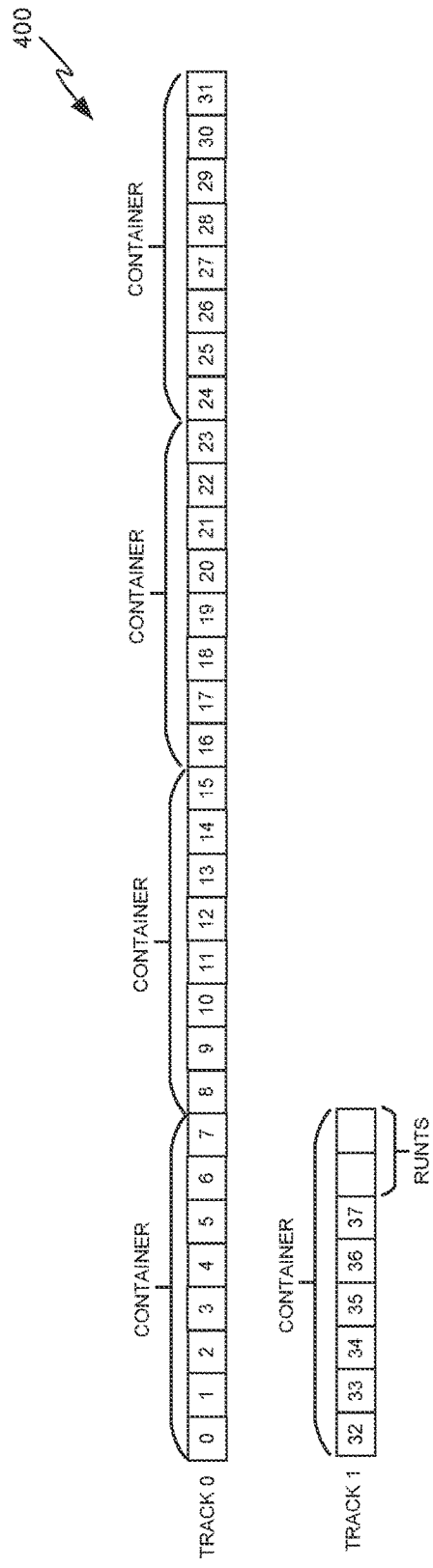
FIG. 4 illustrates a track layout with an example of a zone written to a set of containers in accordance with conventional runtime code and without inserting defects, as a basis of comparison for other examples in accordance with examples of the present disclosure.

FIG. 4 illustrates a track layout 400 with an example of a zone written to a set of containers in accordance with conventional runtime code and without inserting defects, as a basis of comparison for other examples in accordance with examples of the present disclosure. The zone is 38 data blocks in size, numbered 0 through 37, in this example. The containers are uniformly 8 data blocks in size, in this example. The first four containers are comprised in a first data track on disk surface 17A, labeled track 0, and the final container is comprised in a second data track, labeled track 1. The zone is written completely in serial sequence along these containers, and the end of the zone is not aligned with an end of a container. Rather, the zone ends two blocks before the end of the final container, leaving the last two blocks of the final container as runts. These runts would throw an exception in conventional runtime code, and would require a solution such as the runtime code being modified to handle non-container aligned zone boundaries and associated padding.

Figure 5:
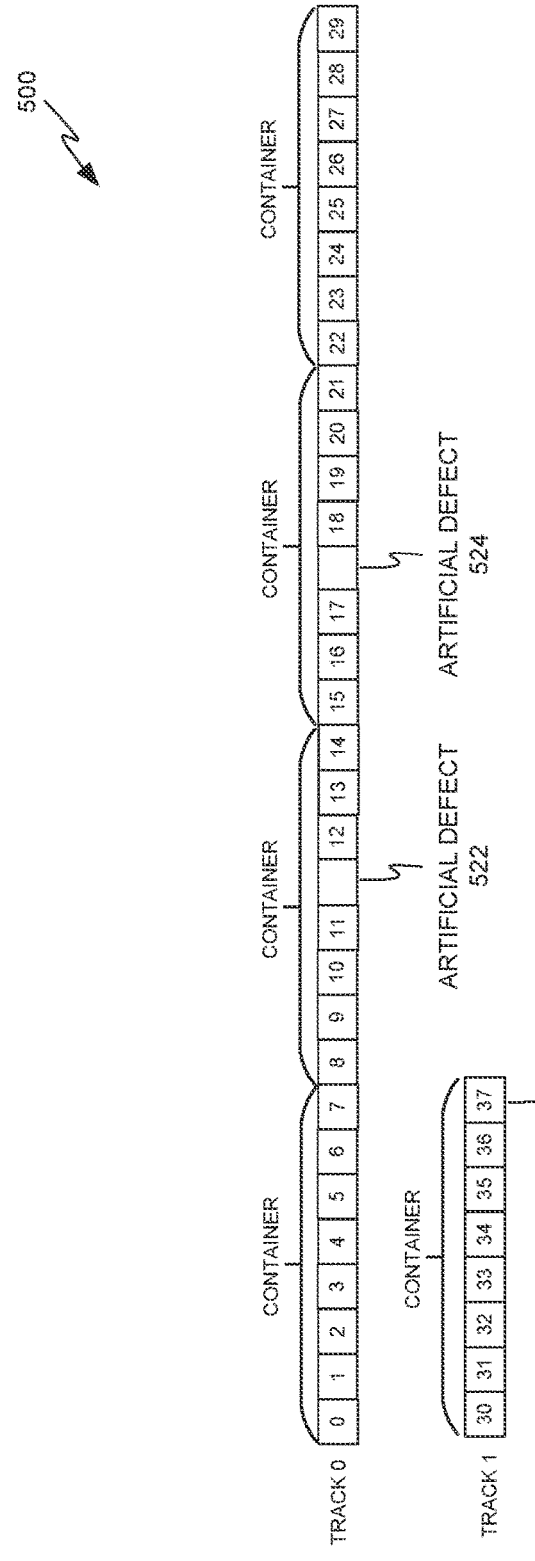
FIG. 5 illustrates a track layout with an example of a zone written to a set of containers in accordance with conventional runtime code, but with designated or artificial defects inserted, in accordance with aspects of the present disclosure.

FIG. 5 illustrates a track layout 500 partly similar to track layout 400 of FIG. 4 with an example of a zone written to a set of containers in accordance with conventional runtime code, but with designated or artificial defects inserted, such as by zone-container alignment module 28 in cooperation with disk formatting code module 24 as described above, in accordance with examples of the present disclosure. (In FIG. 5 and the subsequent figures, the depicted examples may refer to the tracks as written, in compliance with artificial defects or other padding as indicated in mapping 30.) Zone-container alignment module 28 may determine that a received zone information is 38 data blocks in size, that the modulus of an integer number of the containers relative to the zone size is 2 (i.e. the number of containers modulo the zone size is 2, as measured in size in terms of number of data blocks). Zone-container alignment module 28 may thus determine to insert two designated defects 522, 524 in the containers to which the zone is to be written, prior to writing the zone, or after beginning to write the zone and prior to writing to a particular track or section of the zone to include designated defects 522, 524. Zone-container alignment module 28 may "insert defects" to the applicable, target containers merely by inserting one or more indications or labels to mapping 30 of two of the blocks as defects. In this example, zone-container alignment module 28 selects one block in the middle of each of the second and third containers, blocks 522 and 524 in this example, to designate as defects, between blocks 11 and 12 and blocks 17 and 18 of the zone. In various examples, this is at least somewhat of an arbitrary selection of blocks prior to the final block of the final container, and zone-container alignment module 28 may equivalently select any of various other blocks prior to the final block of the final container to designate as defects. In various examples, control circuitry 22 may designate artificial defects adjacent to pre-existing real or artificial defects. In various examples, control circuitry 22 may designate artificial defects located at the start of a track. In various examples, control circuitry 22 may designate artificial defects located at the end of a track, or spread out across a track.

Zone-container alignment module 28 may use any of various techniques to select two blocks within the target containers, prior to the final block of the final container, to indicate as defects. For example, zone-container alignment module 28 may select two of the blocks prior to the final block of the final container at random, or to be at least somewhat evenly spaced out within the total span of target containers, or with reference to any form of criteria that may help optimize the placement of the artificial defects with reference to one or more design goals, to arrive at the labeling of two of the blocks as defects as shown in FIG. 5. Zone-container alignment module 28 may also use other techniques in other examples that may result in a different distribution of artificial defects within the target containers than the distribution of artificial defects as shown in FIG. 5. After the designation of the artificial defects, control circuitry 22 (e.g., by way of or making use of runtime code module 26) may then write the zone to the selected containers, with reference to mapping 30, such that control circuitry 22 writes the zone to the containers as shown in FIG. 5. The final block of the zone is aligned with the final block of the final container, as shown in FIG. 5.

Thus, as shown in FIG. 5, control circuitry 22 may treat a mismatch in size between a designated zone, or at least a portion of a zone, and an integer number of one or more of the data containers in which to write the at least a portion of the zone, as constituting a criterion for inserting padding, such as one or more artificial defects. Control circuitry 22 may be configured such that detecting a criterion for inserting padding, such as artificial defects, may comprise detecting such a mismatch in size between at least a portion of a zone and an integer number of one or more of the data containers in which to write the at least a portion of the zone. Control circuitry 22 may further be configured such that inserting the one or more mapping indicators to mapping 30 of the recording medium of disk surface 17A may comprise inserting one or more indications of one or more designated defects to mapping 30, such as indications for artificial defects 522, 524. The number of the one or more designated defects that control circuitry 22 inserts to the mapping may correspond to a number of data blocks of the mismatch in size between the zone and the one or more of the data containers, such as two artificial defects 522, 524 corresponding to the mismatch of two blocks in size between the zone and the integer number of containers written in the example of FIG. 5. The one or more designated defects that control circuitry 22 inserts to mapping 30 may be inserted by control circuitry 22 at one or more positions prior to a final block of a final data container of the one or more of the data containers to which the zone is written, as shown in FIG. 5.

Figure 8:
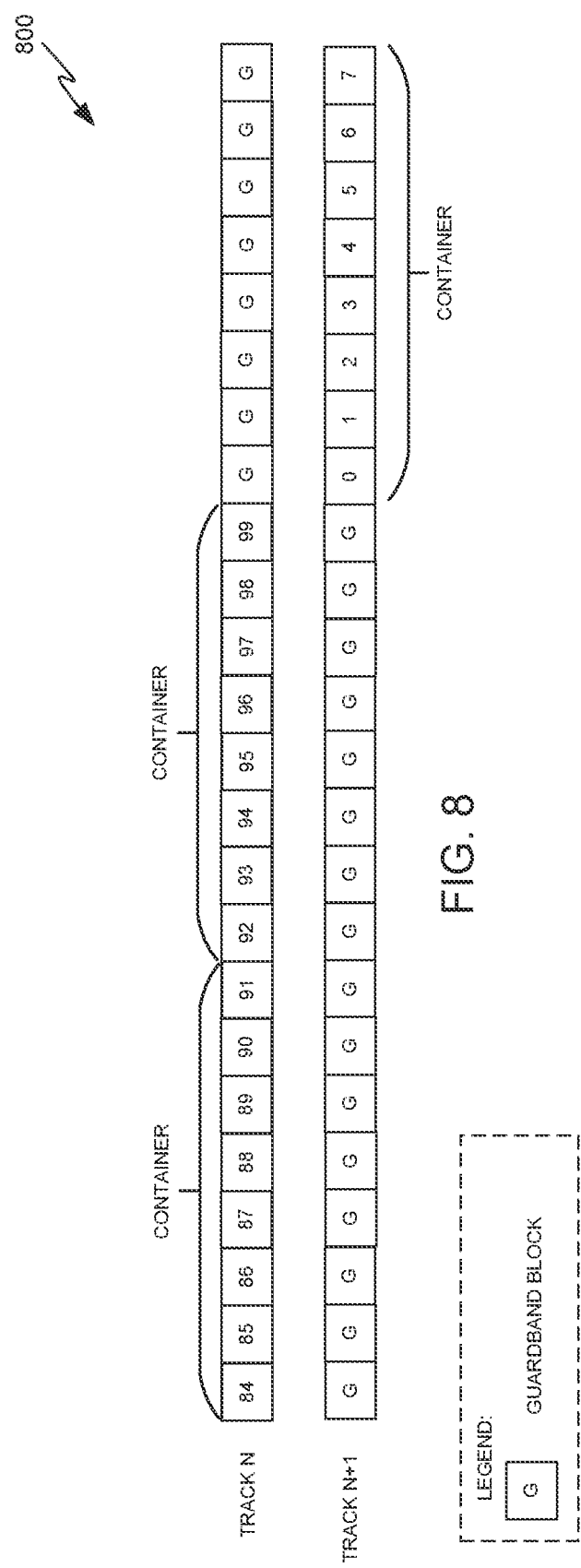

FIGS. 6-8 illustrate track layouts with examples of the end of a first zone written to containers on a final track for that first zone, and the beginning of a second zone written to containers on a first track for that second zone, in accordance with examples of the present disclosure. FIGS. 6-8 each also illustrate examples of the use of mapping specialized padding blocks referred to as guardband blocks, which may or may not be implemented as artificial defects or other non-standard mappings in mapping 30, and FIGS. 6 and 7 each also illustrate the use of mapping specialized padding blocks or artificial defects referred to as orphan blocks, in accordance with examples of the present disclosure.

FIG. 6 illustrates a track layout 600 that shows a first zone that ends on a track N, storing a concluding set of blocks for that first zone in containers on track N—in this illustrative example, blocks 84 through 99 of a first zone in two containers on track N, in accordance with aspects of this disclosure. Control circuitry 22 may designate the remainder of track N as a specialized set of padding blocks, which may be referred to as a guardband, or as guardband blocks, between zones. Control circuitry 22 may place a guardband, which may be free of data, to be in a radially adjacent track or otherwise radially proximate to a track with data written therein, which may help promote the readability of the track with data, as may be measured by signal-to-noise ratio (SNR) or other metric.

In some cases, a track may have a number of blocks that doesn't fit into an integer number of containers, and the container track layout is unable to map all the track's blocks into containers. In such cases, control circuitry 22 may designate a remnant number of blocks in the track that won't fit into an integer number of containers as artificial defects. This particular type of artificial defect may be referred to as an orphan block, or simply an orphan. Guardband blocks may also be designated radially parallel to orphan blocks, such as where the blocks radially parallel to the orphan blocks also do not have enough size to form a complete container, as shown in FIGS. 6 and 7.

In the examples of FIGS. 6 and 7, control circuitry 22 may also designate track N+1 to start with a guardband, or a series of adjacent guardband blocks in a row along the track, at all positions of track N+1 adjacent to the containers in track N. The number of remaining blocks on track N+1 that are not designated as guardband and are capable of storing data is 12. The container constitution for a set of 12 blocks may yield one container of size 8, with 4 blocks left over, which may be left as orphans, outside of a container. Control circuitry 22 may determine to record one new container of size 8 blocks among the remaining 12 blocks in track N+1. The 8 new blocks of data recorded in the single container in track N+1 may be designated blocks 0-7. Control circuitry 22 may designate the 4 blocks after the guardrail and before the new container in track N+1 as artificial defects, or in other words, right-justify the artificial defects and left-justify the container within the available non-guardblock blocks, as in the example of FIG. 6.

In other examples, control circuitry 22 may designate the container in the blocks immediately after the guardrail in track N+1, and then designate the remaining blocks after the new container as artificial defects, or in other words, left-justify the artificial defects and right-justify the container within the available non-guardblock blocks, as in the example of track layout 700 of FIG. 7. These four artificial defects adjacent to the new container in track N+1 in FIGS. 6 and 7 may be referred to as orphans, since they are outside of any container and are used to fill up the remaining modulus of blocks in the track that don't fit into an integer number of containers in the available blocks of the track (after the designation of guardrail blocks, in these examples).

Thus, in various examples, control circuitry 22 may be configured such that detecting a criterion for inserting padding on the recording medium of disk surfaces 17 proximate to one or more data containers to be written to the recording medium may comprise detecting a mismatch in size between a track and an integer number of one or more of the data containers to write to the track, such as in FIGS. 6 and 7. The number of the one or more designated defects may correspond to a number of data blocks of a mismatch in size between the track and the integer number of the one or more of the data containers to write to the track, as in the examples of FIGS. 6 and 7. The one or more designated defects inserted to the mapping may be inserted at one or more positions in a mapping of the track, in the mapping of the recording medium, prior to the one or more of the data containers to write to the track, as in the example of FIG. 6, or may be inserted at one or more positions in the mapping of the track after the one or more of the data containers to write to the track, as in the example of FIG. 7.

In various examples, including potentially after designations of one or more blocks in a track as guardrail blocks, the available number of blocks in a track may be equivalent to an integer number of containers. This case is shown in FIG. 8, which illustrates a track layout 800 in which the number of remaining blocks in track N+1 after the designation of guardrail blocks in track N+1 is 8, and are all able to be assigned to one container, with no blocks left over. In this case, control circuitry 22 may assign the blocks in tracks N and N+1 to containers of a first zone, guardrail blocks, and the first container of a second zone, with no blocks left over to assign as orphans.

Thus, in various examples, control circuitry 22 may assign blocks as padding, and may assign designations of artificial defects in mapping 30 to achieve usage of blocks as padding, within and around zones and containers, both concentrically within tracks, and radially across adjacent tracks (as guardrails). In various examples, control circuitry 22 may assign blocks within tracks as artificial defects or otherwise as padding within zones and containers to align the ends of zones and containers with each other, or outside of zones and containers to use up a remaining number of blocks in a track (as orphans) in any sub-container-sized sections of tracks, that aren't enough to make up a full container. In various examples, control circuitry 22 may assign blocks as padding radially adjacent or side-to-side across tracks to serve as guardbands to avoid adjacent track interference and buttress readability (e.g. as measured by signal-to-noise ratio (SNR), amplitude, or other metric) and enhance reliability of containers, such as when enhanced reliability against potential adjacent track interference is specified or desired, potentially including in SMR.

In the examples of orphans and guardrails, control circuitry 22 inserting one or more mapping indicators to mapping 30, including to a mapping of a particular track in mapping 30 of the recording medium, may comprise inserting indications of one or more orphans and/or guardrails in the form of one or more designated defects to the mapping 30. Control circuitry 22 may insert the one or more designated defects to mapping 30 at one or more positions in the track radially adjacent to one or more of the data containers in a radially adjacent track, or for one or more radial guardband blocks for one or more positions radially adjacent to one or more data containers to write to the track, as in the examples of FIGS. 6-8; or inserted at one or more positions in the track radially adjacent to one or more guardband blocks in a radially adjacent track, as is the case with the orphan blocks in FIGS. 6 and 7. Detecting a criterion for inserting padding, such as radial guardbands, may comprise detecting an indication of radial sensitivity of the one or more data containers, such as an enhanced need for readability and/or an enhanced risk of infringement on readability in SMR. In cases such as these, inserting mapping indicators to mapping 30 may comprise inserting mapping indicators for one or more radial guardband blocks to one or more positions radially adjacent to the one or more data containers, as in in the examples of FIGS. 6-8.

Any suitable control circuitry may be employed to implement the flow diagrams in the above examples, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In some examples, the read channel and data storage controller may be implemented as separate integrated circuits, and in some examples, the read channel and data storage controller may be fabricated into a single integrated circuit or system on a chip (SoC). In some examples, the control circuitry may include a suitable preamp circuit implemented as a separate integrated circuit, integrated into the read channel or data storage controller circuit, or integrated into an SoC.

In some examples, the control circuitry may comprise a microprocessor executing instructions, the instructions being operable to cause the microprocessor to perform one or more aspects of methods, processes, or techniques shown in the flow diagrams and described with reference thereto herein. Executable instructions of this disclosure may be stored in any computer-readable medium. In some examples, executable instructions of this disclosure may be stored on a non-volatile semiconductor memory device, component, or system external to a microprocessor, or integrated with a microprocessor in an SoC. In some examples, executable instructions of this disclosure may be stored on one or more disks and read into a volatile semiconductor memory when the disk drive is powered on. In some examples, the control circuitry may comprises logic circuitry, such as state machine circuitry. In some examples, at least some of the flow diagram blocks may be implemented using analog circuitry (e.g., analog comparators, timers, etc.). In some examples, at least some of the flow diagram blocks may be implemented using digital circuitry or a combination of analog and digital circuitry.

In various examples, one or more processing devices may comprise or constitute the control circuitry as described herein, and/or may perform one or more of the functions of control circuitry as described herein. In various examples, the control circuitry, or other one or more processing devices performing one or more of the functions of control circuitry as described herein, may be abstracted away from being physically proximate to the disks and disk surfaces. The control circuitry, and/or one or more device drivers thereof, and/or one or more processing devices of any other type performing one or more of the functions of control circuitry as described herein, may be part of or proximate to a rack of multiple data storage devices, or a unitary product comprising multiple data storage devices, or may be part of or proximate to one or more physical or virtual servers, or may be part of or proximate to one or more local area networks or one or more storage area networks, or may be part of or proximate to a data center, or may be hosted in one or more cloud services, in various examples.

In various examples, a disk drive may include a magnetic disk drive, an optical disk drive, a hybrid disk drive, or other types of disk drive. Some examples may include electronic devices such as computing devices, data server devices, media content storage devices, or other devices, components, or systems that may comprise the storage media and/or control circuitry as described above.

The various features and processes described above may be used independently of one another, or may be combined in various ways. All possible combinations and subcombinations fall within the scope of this disclosure. Certain method, event or process blocks may be omitted in some implementations. The methods and processes described herein are not limited to any particular sequence, and the blocks or states relating thereto can be performed in other sequences. For example, described tasks or events may be performed in an order other than that specifically disclosed, or multiple may be combined in a single block or state. The example tasks or events may be performed in serial, in parallel, or in another manner. Tasks or events may be added to or removed from the disclosed examples. The example systems and components described herein may be configured differently than described. For example, elements may be added to, removed from, or rearranged compared to the disclosed examples.

While certain example embodiments are described herein, these embodiments are presented by way of example only, and do not limit the scope of the inventions disclosed herein. Thus, nothing in the foregoing description implies that any particular feature, characteristic, step, module, or block is necessary or indispensable. The novel methods and systems described herein may be embodied in a variety of other forms. Various omissions, substitutions and changes in the form of the methods and systems described herein may be made without departing from the spirit and scope of the present disclosure.

Method 80 and other methods of this disclosure may include other steps or variations in various other embodiments. Some or all of any of method 80 and other methods of this disclosure may be performed by or embodied in hardware, and/or performed or executed by a controller, a CPU, an FPGA, a SoC, a measurement and control multiprocessor system on chip (MPSoC), which may include both a CPU and an FPGA, and other elements together in one integrated SoC, or other processing device or computing device processing executable instructions, in controlling other associated hardware, devices, systems, or products in executing, implementing, or embodying various subject matter of the method.

Data storage systems, devices, and methods implemented with and embodying novel advantages of the present disclosure are thus shown and described herein, in various foundational aspects and in various selected illustrative applications, architectures, techniques, and methods for implementing and embodying novel advantages of the present disclosure. Persons skilled in the relevant fields of art will be well-equipped by this disclosure with an understanding and an informed reduction to practice of a wide panoply of further applications, architectures, techniques, and methods for novel advantages, techniques, methods, processes, devices, and systems encompassed by the present disclosure and by the claims set forth below.

As used herein, the recitation of "at least one of A, B and C" is intended to mean "either A, B, C or any combination of A, B and C." The descriptions of the disclosed examples are provided to enable any person skilled in the relevant fields of art to understand how to make or use the subject matter of the present disclosure. Various modifications to these embodiments will be readily apparent to those skilled in the art based on the present disclosure, and the generic principles defined herein may be applied to other examples without departing from the spirit or scope of the disclosure. Thus, the present disclosure is not limited to the embodiments shown herein but is to be accorded the widest scope consistent with the principles and novel features disclosed herein.

The present disclosure and many of its attendant advantages will be understood by the foregoing description, and various changes may be made in the form, construction, and arrangement of the components without departing from the disclosed subject matter or without sacrificing all or any of its material advantages. The form described is merely explanatory, and the following claims encompass and include a wide range of embodiments, including a wide range of examples encompassing any such changes in the form, construction, and arrangement of the components as described herein.

While the present disclosure has been described with reference to various examples, it will be understood that these examples are illustrative and that the scope of the disclosure is not limited to them. All subject matter described herein are presented in the form of illustrative, non-limiting examples, and not as exclusive implementations, whether or not they are explicitly called out as examples as described. Many variations, modifications, and additions are possible within the scope of the examples of the disclosure. More generally, examples in accordance with the present disclosure have been described in the context of particular implementations. Functionality may be separated or combined in blocks differently in various examples of the disclosure or described with different terminology, without departing from the spirit and scope of the present disclosure and the following claims. These and other variations, modifications, additions, and improvements may fall within the scope of the disclosure as defined in the claims that follow.

What is claimed is:

1. A data storage device, comprising:
   one or more disks;
   an actuator mechanism configured to position one or more heads proximate to a recording medium of the one or more disks; and
   one or more processing devices, configured to:
      detect a criterion for inserting padding on a recording medium proximate to one or more data containers to be written to the recording medium, the data containers configured for assigning a plurality of logic blocks to the data containers, the logic blocks configured to store data to be written in an interleaved pattern across a plurality of sectors based on a distributed sector encoding scheme,
      wherein detecting the criterion comprises detecting a mismatch in size between at least a portion of a zone and an integer number of one or more of the data containers in which to write the at least a portion of the zone; and
      insert, in response to detecting the criterion, one or more mapping indicators to a mapping of the recording medium to indicate one or more padding blocks proximate to the one or more data containers on the recording medium,
   wherein the one or more processing devices are further configured such that:
      inserting the one or more mapping indicators to the mapping of the recording medium comprises inserting one or more indications of one or more designated defects to the mapping.

2. The data storage device of claim 1, wherein the zone comprises a host-managed data zone to be managed by a host, external to the data storage device.

3. The data storage device of claim 1, wherein the one or more processing devices are further configured such that a number of the one or more designated defects inserted to the mapping corresponds to a number of data blocks of the mismatch in size between the at least a portion of the zone and the one or more of the data containers.

4. The data storage device of claim 1, wherein the one or more processing devices are further configured such that the one or more designated defects inserted to the mapping are inserted at one or more positions prior to a final block of a final data container of the one or more of the data containers.

5. A data storage device, comprising:
one or more disks;
an actuator mechanism configured to position one or more heads proximate to a recording medium of the one or more disks; and
one or more processing devices, configured to:
  detect a criterion for inserting padding on a recording medium proximate to one or more data containers to be written to the recording medium, the data containers configured for assigning a plurality of logic blocks to the data containers, the logic blocks configured to store data to be written in an interleaved pattern across a plurality of sectors based on a distributed sector encoding scheme,
  wherein detecting the criterion comprises detecting a mismatch in size between at least a portion of a zone and an integer number of one or more of the data containers in which to write the at least a portion of the zone; and
  insert, in response to detecting the criterion, one or more mapping indicators to a mapping of the recording medium to indicate one or more padding blocks proximate to the one or more data containers on the recording medium,
wherein the one or more processing devices are further configured such that:
detecting the criterion comprises detecting a mismatch in size between a track and an integer number of one or more of the data containers to write to the track.

6. The data storage device of claim 5, wherein the one or more processing devices are further configured such that:
  inserting the one or more mapping indicators to the mapping of the recording medium comprises inserting one or more indications of one or more designated defects to a mapping of the track, in the mapping of the recording medium.

7. The data storage device of claim 6, wherein the one or more processing devices are further configured such that the one or more designated defects correspond to a number of data blocks of the mismatch in size between the track and the integer number of the one or more of the data containers to write to the track.

8. The data storage device of claim 7, wherein the one or more processing devices are further configured such that the one or more designated defects inserted to the mapping of the track are inserted at one or more positions in the track prior to the one or more of the data containers to write to the track.

9. The data storage device of claim 7, wherein the one or more processing devices are further configured such that the one or more designated defects inserted to the mapping of the track are inserted at one or more positions in the track after the one or more of the data containers to write to the track.

10. The data storage device of claim 7, wherein the one or more processing devices are further configured such that the one or more designated defects inserted to the mapping of the track are inserted at one or more positions in the track radially adjacent to one or more guardband blocks in a radially adjacent track.

11. The data storage device of claim 5, wherein the one or more processing devices are further configured such that inserting the one or more mapping indicators to the mapping of the recording medium comprises inserting mapping indicators for one or more radial guardband blocks for one or more positions radially adjacent to the one or more data containers to write to the track.

12. A data storage device, comprising:
one or more disks;
an actuator mechanism configured to position one or more heads proximate to a recording medium of the one or more disks; and
one or more processing devices, configured to:
  detect a criterion for inserting padding on a recording medium proximate to one or more data containers to be written to the recording medium, the data containers configured for assigning a plurality of logic blocks to the data containers, the logic blocks configured to store data to be written in an interleaved pattern across a plurality of sectors based on a distributed sector encoding scheme,
  wherein detecting the criterion comprises detecting a mismatch in size between at least a portion of a zone and an integer number of one or more of the data containers in which to write the at least a portion of the zone; and
  insert, in response to detecting the criterion, one or more mapping indicators to a mapping of the recording medium to indicate one or more padding blocks proximate to the one or more data containers on the recording medium,
wherein the one or more processing devices are further configured such that:
detecting the criterion comprises detecting an indication of radial sensitivity of the one or more data containers; and
inserting the mapping indicators to the mapping of the recording medium comprises inserting mapping indicators for one or more radial guardband blocks to one or more positions radially adjacent to the one or more data containers.

13. The data storage device of claim 1, wherein the one or more processing devices are further configured to write data to the recording medium pursuant to the mapping of the recording medium.

14. A method comprising:
detecting, by one or more processing devices, a criterion for inserting padding on a recording medium proximate to one or more data containers to be written to the recording medium, the data containers configured for assigning a plurality of logic blocks to the data containers, the logic blocks configured to store data to be written in an interleaved pattern across a plurality of sectors based on a distributed sector encoding scheme,
wherein detecting the criterion comprises detecting a mismatch in size between at least a portion of a zone and an integer number of one or more of the data containers in which to write the at least a portion of the zone; and
inserting, by the one or more processing devices, in response to detecting the criterion, one or more mapping indicators to a mapping of the recording medium to indicate one or more padding blocks proximate to the one or more data containers on the recording medium, and
wherein the inserting the one or more mapping indicators to the mapping of the recording medium comprises inserting one or more indications of one or more designated defects to the mapping.

15. The method of claim 14, wherein the zone comprises a host-managed data zone to be managed by a host, external to the data storage device.

16. The method of claim 14, wherein detecting the criterion comprises detecting a mismatch in size between a track and an integer number of one or more of the data containers to write to the track, wherein inserting the one or more mapping indicators to the mapping of the recording medium comprises inserting one or more indications of one or more designated defects to a mapping of the track, in the mapping of the recording medium, and wherein the one or more designated defects correspond to a number of data blocks of the mismatch in size between the track and the integer number of the one or more of the data containers to write to the track.

17. One or more processing devices comprising:

means for detecting a criterion for inserting padding on a recording medium proximate to one or more data containers to be written to the recording medium, the data containers configured for assigning a plurality of logic blocks to the data containers, the logic blocks configured to store data to be written in an interleaved pattern across a plurality of sectors based on a distributed sector encoding scheme, wherein the means for detecting the criterion comprises means for detecting a mismatch in size between at least a portion of a zone and an integer number of one or more of the data containers in which to write the at least a portion of the zone; and means for inserting, in response to detecting the criterion, one or more mapping indicators to a mapping of the recording medium to indicate one or more padding blocks proximate to the one or more data containers on the recording medium, wherein the means for inserting the one or more mapping indicators to the mapping of the recording medium comprises means for inserting one or more indications of one or more designated defects to the mapping.

18. The one or more processing devices of claim 17, wherein the zone comprises a host-managed data zone to be managed by a host, external to the data storage device.

19. One or more processing devices comprising:

means for detecting a criterion for inserting padding on a recording medium proximate to one or more data containers to be written to the recording medium, the data containers configured for assigning a plurality of logic blocks to the data containers, the logic blocks configured to store data to be written in an interleaved pattern across a plurality of sectors based on a distributed sector encoding scheme, wherein the means for detecting the criterion comprises means for detecting a mismatch in size between at least a portion of a zone and an integer number of one or more of the data containers in which to write the at least a portion of the zone; and means for inserting, in response to detecting the criterion, one or more mapping indicators to a mapping of the recording medium to indicate one or more padding blocks proximate to the one or more data containers on the recording medium, wherein the means for detecting the criterion comprises means for detecting a mismatch in size between a track and an integer number of one or more of the data containers to write to the track, wherein the means for inserting the one or more mapping indicators to the mapping of the recording medium comprises means for inserting one or more indications of one or more designated defects to a mapping of the track, in the mapping of the recording medium, and wherein the one or more designated defects correspond to a number of data blocks of the mismatch in size between the track and the integer number of the one or more of the data containers to write to the track.

\* \* \* \* \*